(12) United States Patent
Konno et al.

(10) Patent No.: US 11,104,320 B2
(45) Date of Patent: Aug. 31, 2021

(54) BRAKE BLEEDING DEVICE

(71) Applicant: TOYOTA JIDOSHA KABUSHIKI KAISHA, Toyota (JP)

(72) Inventors: Ikuru Konno, Toyoake (JP); Takenori Kubo, Okazaki (JP); Keiichi Naito, Toyota (JP); Kazuki Uesugi, Toyota (JP); Akira Takioka, Nisshin (JP); Itsuki Miyachi, Toyota (JP); Yuji Saito, Toyota (JP); Taisei Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/930,782

(22) Filed: May 13, 2020

(65) Prior Publication Data

US 2021/0016763 A1    Jan. 21, 2021

(30) Foreign Application Priority Data

Jul. 17, 2019  (JP) .............................. JP2019-131713

(51) Int. Cl.
*B60T 17/22*    (2006.01)
(52) U.S. Cl.
CPC .................................. *B60T 17/223* (2013.01)
(58) Field of Classification Search
CPC ................ F16D 2125/16; F16D 48/02; F16D 2500/5118; F15B 21/044; B60T 8/34; B60T 11/00; B60T 11/30; B60T 13/745; B60T 7/042; B60T 17/222; B60T 17/223; B60T 13/52; G05G 1/30; G05G 1/54; Y10T 70/5721; Y10T 70/5889

USPC ............. 188/352; 411/412; 60/584; 137/343, 137/884, 844; 92/13.4; 70/199, 237
See application file for complete search history.

(56) References Cited

U.S. PATENT DOCUMENTS 2,145,590 A * 1/1939 Fitzgerald ............. B60T 11/102
                                                                    188/106 P
2,649,814 A * 8/1953 Brazell ..................... B60S 5/00
                                                                    74/481

(Continued)

FOREIGN PATENT DOCUMENTS

JP          07-061344 A      3/1995
JP          2002-053032 A    2/2002

*Primary Examiner* — Robert A. Siconolfi
*Assistant Examiner* — San M Aung
(74) *Attorney, Agent, or Firm* — Sughrue Mion, PLLC

(57) ABSTRACT

Provided is a brake bleeding device for bleeding air accumulated in brake fluid inside a braking device provided in a vehicle. The brake bleeding device includes: a master cylinder constituting a part of the braking device and provided inside a front-side storage chamber, the master cylinder being configured to generate brake hydraulic pressure in accordance with a stroke of an input piston; a brake pedal unit provided inside the front-side storage chamber and configured to give pressing force in a stroke direction to the input piston when a link mechanism connected to the input piston via a rod is operated; and an operating lever attached to the link mechanism in a state where the link mechanism is operable by the operating lever. The operating lever extends downward to a position where the operating lever is accessible from outside the front-side storage chamber.

2 Claims, 14 Drawing Sheets

(56) References Cited

U.S. PATENT DOCUMENTS

| | | | | |
|---|---|---|---|---|
| 3,713,292 | A | * | 1/1973 | Huffman .............. B60T 11/24 60/550 |
| 4,800,725 | A | * | 1/1989 | Kaulig .............. B60T 17/222 141/369 |
| 5,381,662 | A | * | 1/1995 | Ethen .............. B60T 17/222 60/584 |
| 2001/0047915 | A1 | | 12/2001 | Takakubo et al. |
| 2003/0106754 | A1 | * | 6/2003 | Buckley .............. B60T 17/16 188/359 |
| 2005/0183420 | A1 | * | 8/2005 | Dasilva .............. B60T 17/222 60/584 |
| 2005/0269871 | A1 | * | 12/2005 | Saito .............. B60T 8/3255 303/20 |
| 2006/0169549 | A1 | * | 8/2006 | Lang .............. B60T 11/10 188/73.1 |
| 2013/0284015 | A1 | * | 10/2013 | Menten .............. B60T 17/222 92/145 |

\* cited by examiner

BRAKE BLEEDING DEVICE

INCORPORATION BY REFERENCE

The disclosure of Japanese Patent Application No. 2019-131713 filed on Jul. 17, 2019 including the specification, drawings and abstract is incorporated herein by reference in its entirety.

BACKGROUND

1. Technical Field

The present disclosure relates to a brake bleeding device configured to bleed air accumulated in brake fluid inside a braking device provided in a vehicle.

2. Description of Related Art

When air is accumulated in brake fluid in a braking device provided in a vehicle, the brake does not work well. In view of this, it is necessary to regularly perform a bleeding operation to bleed the air accumulated in the brake fluid.

When such a bleeding operation is performed, a vehicle body is jacked up, and tires are removed. Then, a bleeding valve provided in a caliper is loosened, and a fluid collection tube is connected. After that, due to brake hydraulic pressure generated by stepping a brake pedal several times inside a vehicle cabin, the air is discharged from the fluid collection tube together with old brake fluid. This is a general procedure.

Further, for example, Japanese Unexamined Patent Application Publication No. 2002-053032 (JP 2002-053032 A) describes a bleeding operation tool including an air cylinder portion configured such that a pedal attachment portion is provided in a first end of the air cylinder portion and an abutment piece portion for positioning and fixation is provided in a second end of the air cylinder portion so that the bleeding operation can be easily performed by one person. In the bleeding operation tool, by supplying and stopping air to the air cylinder portion, a pressing operation to press a brake pedal portion is performable repeatedly.

SUMMARY

In the meantime, in recent years, along with the progress of an automated driving technology, research and development have been made in terms of a vehicle configured such that operating means (e.g., a steering wheel or the like) mechanically connected to a device arranged in a so-called engine compartment is not provided inside a vehicle cabin. As a part of this, research and development have been also made in terms of a vehicle including a braking device including operating means such as a brake pedal that is not provided inside a vehicle cabin.

However, in either case of the above general bleeding technique and the above bleeding operation tool in JP 2002-053032 A, a bleeding operation is performed on the premise that brake hydraulic pressure is generated by pressing the brake pedal provided in the vehicle cabin.

On this account, in a case of a vehicle provided with a braking device configured such that operating means such as a brake pedal that is configured to generate hydraulic pressure is not provided inside a vehicle cabin, maintenance performance at the time of a bleeding operation might decrease.

The present disclosure is accomplished in view of such a problem, and an object of the present disclosure is to provide a technology for a brake bleeding device for bleeding air accumulated in brake fluid, the technology being for improving maintenance performance at the time of a bleeding operation even in a case where operating means configured to generate hydraulic pressure is not provided inside a vehicle cabin.

In order to achieve the above object, the brake bleeding device according to the present disclosure is configured such that a jig (lever) that can operate operating means provided in a storage chamber separated from the vehicle cabin is provided in a state where the jig is accessible from outside a vehicle.

More specifically, the present disclosure is targeted for a brake bleeding device for bleeding air accumulated in brake fluid inside a braking device provided in a vehicle.

The brake bleeding device includes a master cylinder, a pressing portion, and an operating lever. The master cylinder constitutes a part of the braking device, and the master cylinder is arranged inside a storage chamber separated from a vehicle cabin. The master cylinder is configured to generate brake hydraulic pressure in accordance with a stroke of a piston sliding inside the cylinder. The pressing portion is arranged inside the storage chamber and configured to give pressing force in a stroke direction to the piston when an operating portion connected to the piston via a rod is operated. The operating lever is attached to the operating portion in a state where the operating portion is operable by the operating lever. The operating lever extends downward to a position where the operating lever is accessible from outside the storage chamber.

In this configuration, when the operating portion connected to the piston via the rod is operated by the operating lever, brake hydraulic pressure can be generated. Accordingly, even when the pressing portion is arranged inside the storage chamber separated from the vehicle cabin, in other words, even when the operating means configured to generate hydraulic pressure is not provided inside the vehicle cabin, the air accumulated in the brake fluid can be surely bled.

Besides, the operating lever attached to the operating portion extends downward to a position where the operating lever is accessible from outside the storage chamber. Accordingly, the operating lever can be easily operated from outside the vehicle. Hereby, operations such as connection of a fluid collection tube to a bleeding valve, bleeding by an operation of the operating lever, and check of the air discharged from the fluid collection tube, for example, are performable by only one operator. This makes it possible to improve maintenance performance at the time of a bleeding operation.

Further, in the brake bleeding device, the pressing portion may be a brake pedal unit including a brake pedal and a link mechanism configured to displace the rod in response to an operation of the brake pedal, and the operating portion may be the link mechanism.

In this configuration, an existing brake configuration of a conventional vehicle in which a brake pedal unit mechanically connected to a master cylinder in a storage chamber is provided inside a vehicle cabin can be employed for the vehicle of the present disclosure in which the brake pedal unit is not provided inside the vehicle cabin. This makes it possible to restrain an increase in cost.

Further, in the brake bleeding device, the brake pedal unit may be arranged inside the storage chamber such that the brake pedal is placed on an upper side and the link mechanism is placed on a lower side.

With this configuration, since the link mechanism is placed on the lower side, an attachment structure of the operating lever to the operating portion (the link mechanism) can be made a simple structure. Also, since the brake pedal is placed on the upper side, it is possible to restrain the brake pedal from interfering with other devices and so on arranged below the master cylinder, for example.

Further, in the brake bleeding device, the operating lever may be configured to be detachably attached to the operating portion from below the vehicle.

With this configuration, since the operating lever is detachably attached to the operating portion, the operating lever can be removed at the time of traveling, for example. This makes it possible to avoid such a situation that the brake is actuated unintentionally when a lower end portion of the operating lever interferes with an object on a road surface.

Further, since the operating lever is attachable from below the vehicle, the operating lever can be easily attached to the vehicle jacked up for a bleeding operation. This makes it possible to further improve the maintenance performance at the time of the bleeding operation.

As described above, with the brake bleeding device of the present disclosure, even in a case where operating means configured to generate hydraulic pressure is not provided inside a vehicle cabin, it is possible to improve the maintenance performance at the time of the bleeding operation.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

With reference to the drawings, the following describes an embodiment to carry out the present disclosure. Note that, in each of the drawings, an arrow Fr indicates the front side in the vehicle front-rear direction, an arrow Rh indicates the right side in the vehicle width direction, and an arrow Up indicates the upper side.

Overall Configuration of Vehicle

Figure 1:
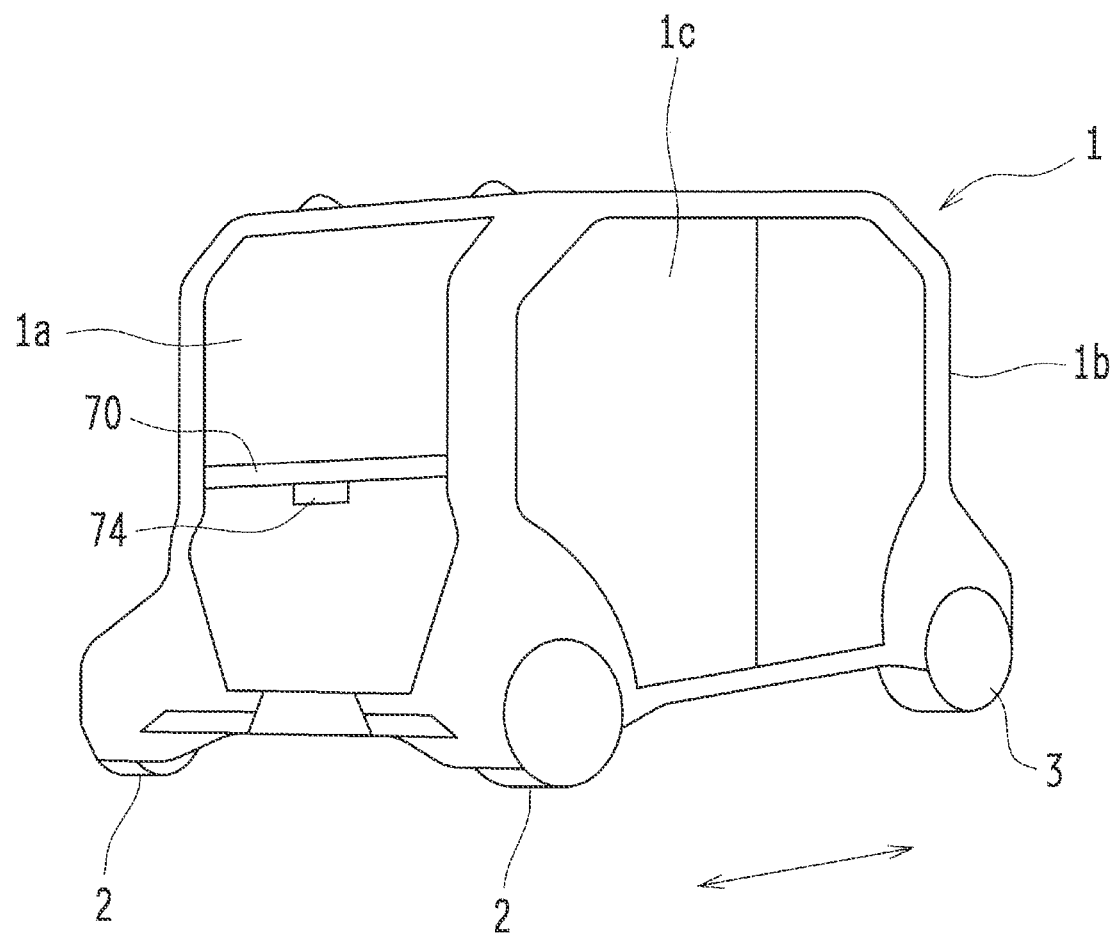
FIG. 1 is a perspective view schematically illustrating a vehicle according to an embodiment.

FIG. 1 is a perspective view schematically illustrating a vehicle 1 according to the present embodiment. As illustrated in FIG. 1, the vehicle 1 has an external appearance that is greatly different from conventional general vehicles in that, for example, its vehicle body is almost symmetrical in an advancing direction (see an arrow in FIG. 1), wheels 2, 3 are arranged extremely close to both ends of the vehicle 1, respectively, there is no hood or the like covering an engine compartment (a motor room), and an almost entire surface of a side face 1c is configured as a doorway. The vehicle 1 has a generally symmetric vehicle body in the advancing direction. However, the left side in FIG. 1 is described as a front end portion 1a (reference numerals 2 indicate front wheels), and the right side in FIG. 1 is described as a rear end portion 1b (reference numerals 3 indicate rear wheels).

Figure 2:
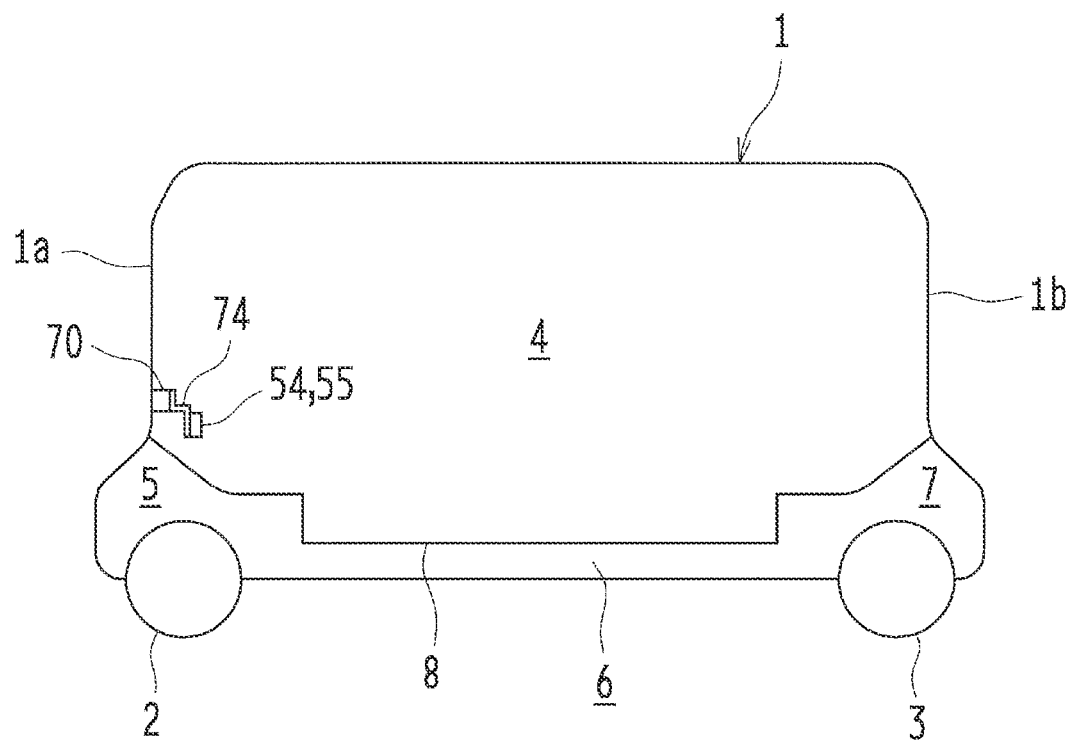
FIG. 2 is a vertical sectional view schematically illustrating the inside of the vehicle.

FIG. 2 is a vertical sectional view schematically illustrating the inside of the vehicle 1. Note that, in FIG. 2, seats and so on are not illustrated. The vehicle 1 is a vehicle in which so-called "automated driving" is enabled, and because of this, not only the external appearance but also the inside of the vehicle 1 is greatly different from conventional general vehicles as illustrated in FIG. 2. Note that the "automated driving" is a concept that includes not only fully-automated driving that does not need any operation by an occupant at all, but also semi-automated driving in which the occupant performs auxiliary operations.

For example, the vehicle 1 performs automated driving such that an ECU 50 (see FIG. 4) actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on.

Therefore, in the vehicle 1, the presence of a so-called "driver" is not essential. As illustrated in FIG. 2, operating means such as a steering wheel and a brake pedal to be operated by the driver is not permanently provided in a vehicle cabin 4. Because of this, a proportion of the vehicle cabin 4 in the entire vehicle 1 is very large. Note that the state where "the operating means is not permanently provided in the vehicle cabin 4" includes a case where the operating means is not provided at all in the vehicle 1 itself and also includes a case where the operating means that is normally hidden in storage chambers 5, 7 or an underfloor space 6 appears in the vehicle cabin 4 as a result of a button operation and so on, for example, when an unexpected situation occurs.

As a matter of course, the vehicle 1 is configured to perform the fully-automated driving by the ECU 50 and so on and also perform the semi-automated driving in which an auxiliary operation is performed by an operator as a monitoring person who is seated on a seat 9 (see FIG. 8) provided in a front part inside the vehicle cabin 4. For example, a system of the vehicle 1 is configured such that the operator monitors situations around the vehicle 1 when a periphery image captured by the camera is projected on a tablet PC (not shown) owned by the operator, and the operator actuates various in-vehicle devices by pressing a button icon on an image on the tablet PC.

Note that the presence of the operator in the vehicle cabin 4 is also not essential, and for example, an operator and so on in an external management center may play a role of the operator inside the vehicle cabin 4, or an external server may play a similar role.

Further, in the vehicle 1, the front-side and rear-side storage chambers 5, 7 are formed in the front end portion 1a and the rear end portion 1b of the vehicle 1, respectively, so as to partially overlap the vehicle cabin 4 in the vehicle front-rear direction, as illustrated in FIG. 2. In the front-side and rear-side storage chambers 5, 7, driving system apparatuses and electric system apparatuses such as the ECU 50, the electric drive motor 51, the steering actuator, and the brake actuator 20 are stored. More specifically, the front-side and rear-side storage chambers 5, 7 are separated from the vehicle cabin 4 by frame members such as side rails 65 (see FIG. 6) and a crossmember 63 (see FIG. 6) to be described later, and panel members of a cabin constituting the vehicle cabin 4 (hereinafter also referred to as a frame member 8 or the like). Thus, in the vehicle 1, spaces above the front-side and rear-side storage chambers 5, 7 can be used as the vehicle cabin 4.

As such, by elaborating configurations, structures, and arrangement of various pieces of onboard equipment, the vehicle 1 of the present embodiment that is greatly different from conventional general vehicles is achieved as a vehicle in which the proportion of the vehicle cabin 4 in the entire vehicle 1 is very large (proportions of the front-side and rear-side storage chambers 5, 7 and so on where the onboard equipment is stored are very low), as described above. The following describes details of a functional configuration, a structure, arrangement, and so on of a braking device 10 as a part of factors that achieve such a relatively wide vehicle cabin 4.

Braking Device

Arrangement of Braking Device

Figure 3:
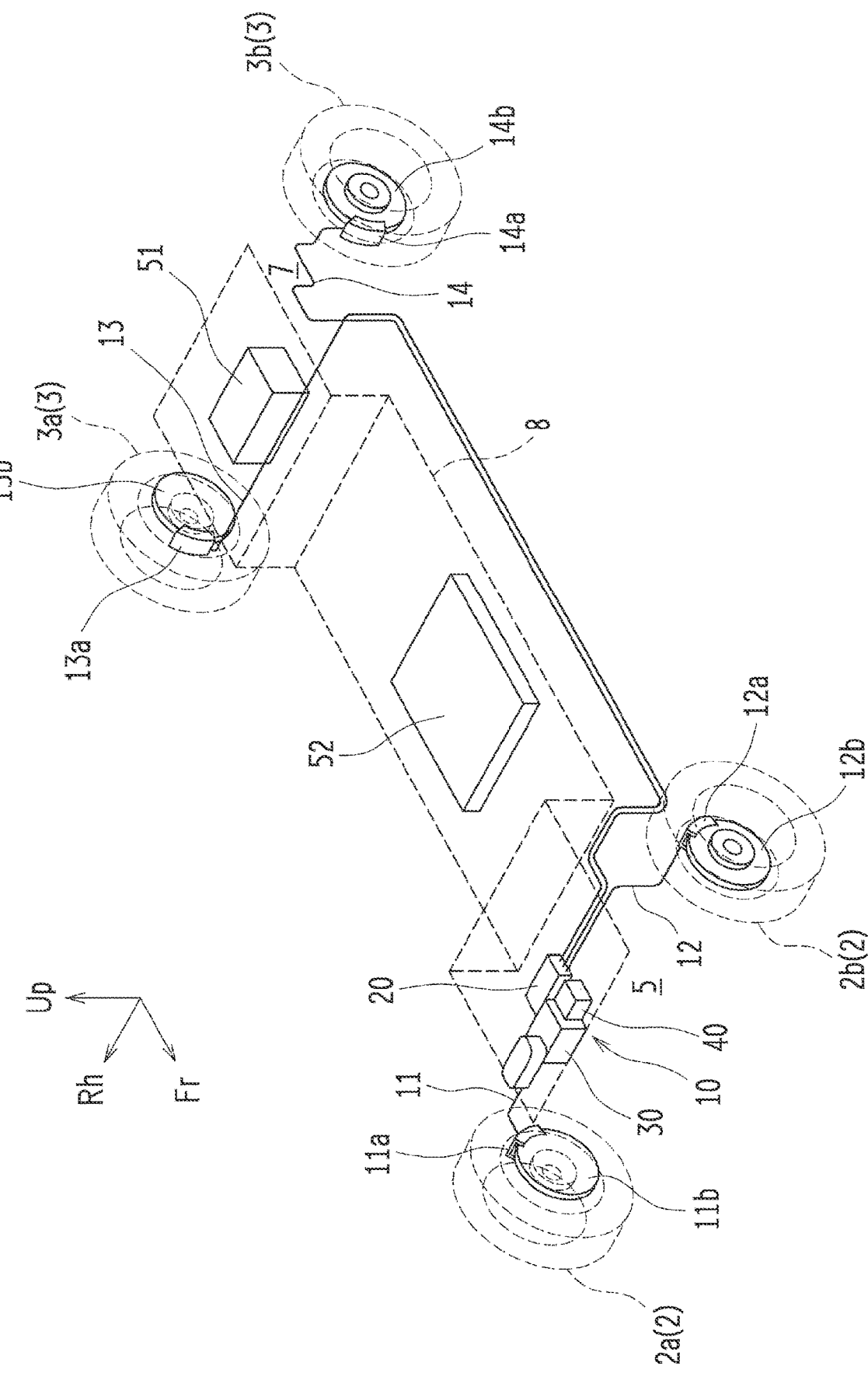
FIG. 3 is a perspective view schematically illustrating a braking device.

FIG. 3 is a perspective view schematically illustrating the braking device 10. As illustrated in FIG. 3, the braking device 10 includes a brake actuator 20, a master cylinder 30, a brake pedal unit 40, first to fourth brake pipes 11, 12, 13, 14, first to fourth brake calipers 11a, 12a, 13a, 14a, and first to fourth brake discs 11b, 12b, 13b, 14b.

In the braking device 10, the brake actuator 20, the master cylinder 30, and the brake pedal unit 40 are arranged inside the front-side storage chamber 5. Note that the electric drive motor 51 as a driving source of the vehicle 1 is arranged inside the rear-side storage chamber 7 provided on the opposite side from the brake actuator 20, the master cylinder 30, and the brake pedal unit 40.

The brake actuator 20 and the master cylinder 30 are electrically actuated devices configured to generate brake hydraulic pressure in electric motors 26, 36 (see FIG. 5) and are configured to be actuated by use of a battery 52 as a power source, the battery 52 being arranged in the underfloor space 6 in the central part of the vehicle 1.

The first brake caliper 11a and the first brake disc 11b are provided in a right front wheel 2a. The first brake caliper 11a is connected to a first port 23a (see FIG. 4) of the brake actuator 20 via the first brake pipe 11 extending to the right side in the vehicle width direction inside the front-side storage chamber 5. Further, the second brake caliper 12a and the second brake disc 12b are provided in a left front wheel 2b. The second brake caliper 12a is connected to a second port 23b (see FIG. 4) of the brake actuator 20 via the second brake pipe 12 extending to the left side in the vehicle width direction inside the front-side storage chamber 5.

The third brake caliper 13a and the third brake disc 13b are provided in a right rear wheel 3a. The third brake caliper 13a is connected to a third port 24a (see FIG. 4) of the brake actuator 20 via the third brake pipe 13. The third brake pipe 13 first extends to the left side in the vehicle width direction inside the front-side storage chamber 5 and then extends rearward in the vehicle front-rear direction inside the underfloor space 6 so as to reach the rear-side storage chamber 7. Then, the third brake pipe 13 extends to the right side in the vehicle width direction inside the rear-side storage chamber 7. Further, the fourth brake caliper 14a and the fourth brake disc 14b are provided in a left rear wheel 3b. The fourth brake caliper 14a is connected to a fourth port 24b (see FIG. 4) of the brake actuator 20 via the fourth brake pipe 14. The fourth brake pipe 14 reaches the rear-side storage chamber 7 similarly to the third brake pipe 13, and then, the fourth brake pipe 14 extends to the left side in the vehicle width direction inside the rear-side storage chamber 7.

Brake Hydraulic Pressure Transmission Route

Figure 4:
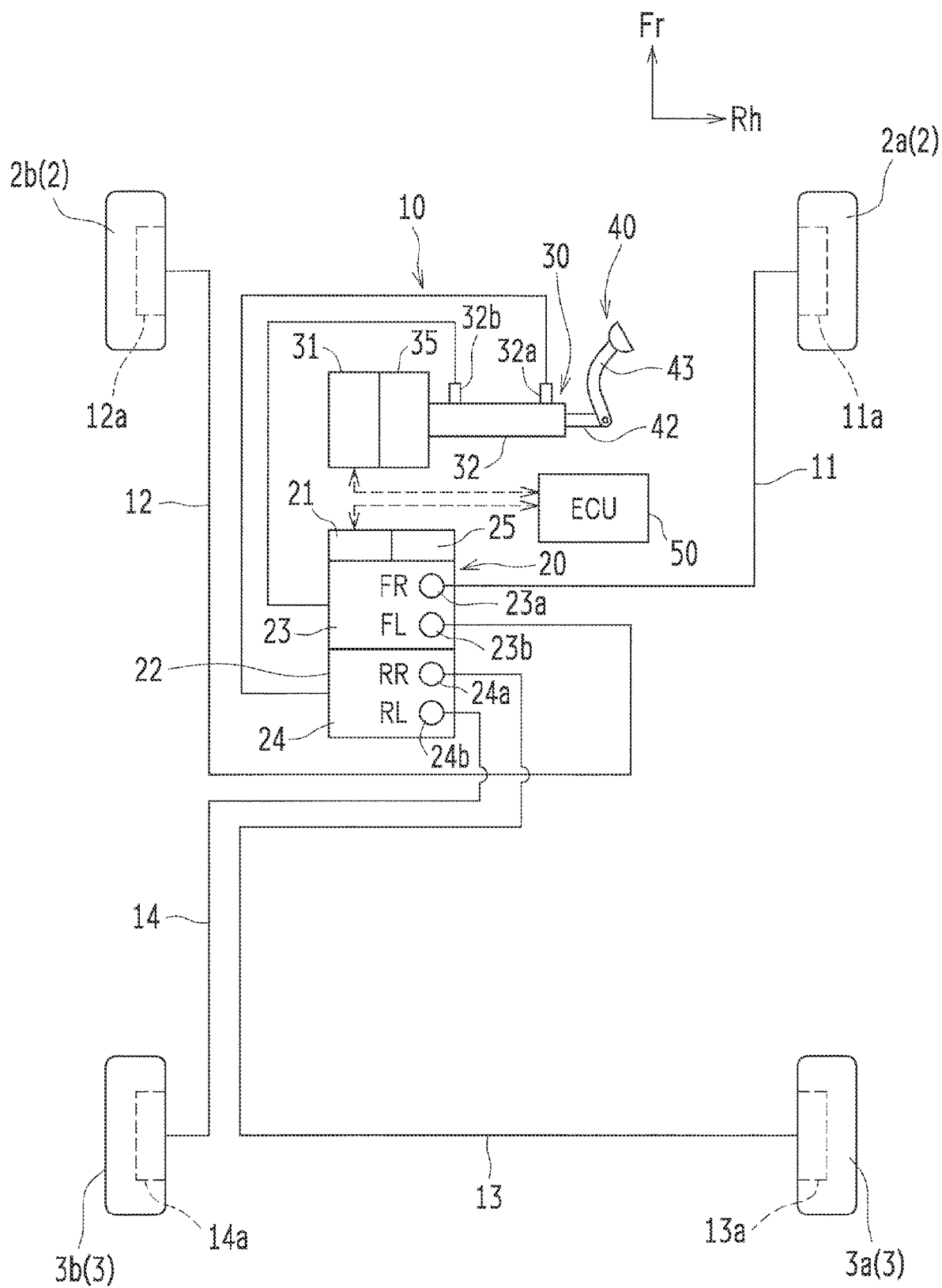
FIG. 4 is a view to schematically describe a brake hydraulic pressure transmission route.

FIG. 4 is a view to schematically describe a brake hydraulic pressure transmission route. In the brake hydraulic pressure transmission route, as illustrated in FIG. 4, the master cylinder 30 is placed on the uppermost stream side, and the brake actuator 20 is placed on the downstream side from the master cylinder 30, so that brake hydraulic pressure is supplied from the brake actuator 20 to the first to fourth brake calipers 11a, 12a, 13a, 14a. Note that a stepping portion 43a of a brake pedal 43 is cut and removed as described below, but, in FIGS. 4 and 5, the brake pedal 43 including the stepping portion 43a is illustrated for convenience.

The brake actuator 20 functions as a main brake hydraulic pressure source in the braking device 10. The brake actuator 20 includes a brake ECU 21, an actuator body portion 22, a reservoir tank 25, and the electric motor 26. The brake ECU 21 is connected to the ECU 50 via a communication line and is configured to actuate the electric motor 26 based on a braking force request calculated by the ECU 50 based on information (a vehicle speed, a distance to a stop line or an obstacle, and so on) from the sensor, the camera, and so on so that the electric motor 26 pumps up brake fluid from the reservoir tank 25 and pressurizes the brake fluid. That is, the brake actuator 20 is configured to generate brake hydraulic pressure as much as necessary (to an extent requested by the ECU 50) when necessary (when the ECU 50 makes a request).

The actuator body portion 22 is divided into a first fluid chamber 23 and a second fluid chamber 24. The first and second ports 23a, 23b are formed in the first fluid chamber 23, and the brake fluid pressurized by the electric motor 26 based on a command from the brake ECU 21 is supplied from the first and second ports 23a, 23b to the first and second brake calipers 11a, 12a, respectively. In the meantime, the third and fourth ports 24a, 24b are formed in the second fluid chamber 24, and the brake fluid pressurized by the electric motor 26 based on the command from the brake ECU 21 is supplied from the third and fourth ports 24a, 24b to the third and fourth brake calipers 13a, 14a, respectively.

Since the actuator body portion 22 is divided into two fluid chambers as such, even if one of the fluid chambers is broken or the like, it is possible to supply the brake hydraulic pressure to the front wheels 2 or the rear wheels 3 from the other one of the fluid chambers without losing the brake hydraulic pressure. Further, since the brake actuator 20 is placed on the downstream side from the master cylinder 30, even when the master cylinder 30 has a malfunction, it is possible to independently supply the brake hydraulic pressure to the first to fourth brake calipers 11a, 12a, 13a, 14a.

The master cylinder 30 includes a brake ECU 31, a cylinder housing 32, first and second pistons 33, 34 (see FIG. 5) sliding inside the cylinder housing 32, a reservoir tank 35, and the electric motor 36. The master cylinder 30 is configured to generate brake hydraulic pressure in accordance with strokes of the first and second pistons 33, 34. The electric motor 36 is configured to pressurize brake fluid pumped up from the reservoir tank 35 and constantly maintain the brake fluid at high pressure. The brake ECU 31 is connected to the ECU 50 via a communication line, and based on a braking force request calculated by the ECU 50, the brake ECU 31 opens a second electromagnetic valve 39 (see FIG. 5) so as to release the high-pressure brake fluid so that the first and second pistons 33, 34 are slid inside the cylinder housing 32 by the high-pressure brake fluid. The brake hydraulic pressure thus generated in accordance with the strokes of the first and second pistons 33, 34 is supplied from the first and second ports 32a, 32b provided in the cylinder housing 32 to the first to fourth brake calipers 11a, 12a, 13a, 14a via the first and second fluid chambers 23, 24 of the brake actuator 20.

As such, the master cylinder 30 generates the brake hydraulic pressure independently from the brake actuator 20. Accordingly, even in a case where an electric system of the brake actuator 20 has a malfunction, when at least either one of the first and second fluid chambers 23, 24 is not damaged, it is possible to supply the brake hydraulic pressure to the front wheels 2 or the rear wheels 3.

On the other hand, the brake pedal unit 40 is not used as a brake for generating braking force and is configured as a part of a brake bleeding device 80 configured to bleed air accumulated in the brake fluid in the braking device 10 as described below. The brake pedal unit 40 includes an input piston 41 (see FIG. 5) sliding inside the cylinder housing 32 of the master cylinder 30, a brake pedal 43, and a rod 42 connecting the input piston 41 to the brake pedal 43 via a link mechanism 45 (see FIG. 11).

As described above, in the present embodiment, (A) at normal time when the electric system does not have any malfunction or the like, the brake actuator 20 supplies the brake hydraulic pressure as a main brake hydraulic pressure generation source. In the meantime, (B) in a case where the brake actuator 20 has a malfunction, the master cylinder 30 as a substitute brake hydraulic pressure generation source supplies the brake hydraulic pressure.

The first to fourth brake calipers 11a, 12a, 13a, 14a then actuate wheel cylinders (not shown) provided therein by the brake hydraulic pressure supplied from the first to fourth ports 23a, 23b, 24a, 24b. Hereby, respective brake pads (not shown) are pressed against the first to fourth brake discs 11b, 12b, 13b, 14b so as to generate frictional braking force, so that the vehicle 1 is decelerated or stopped.

Figure 5:
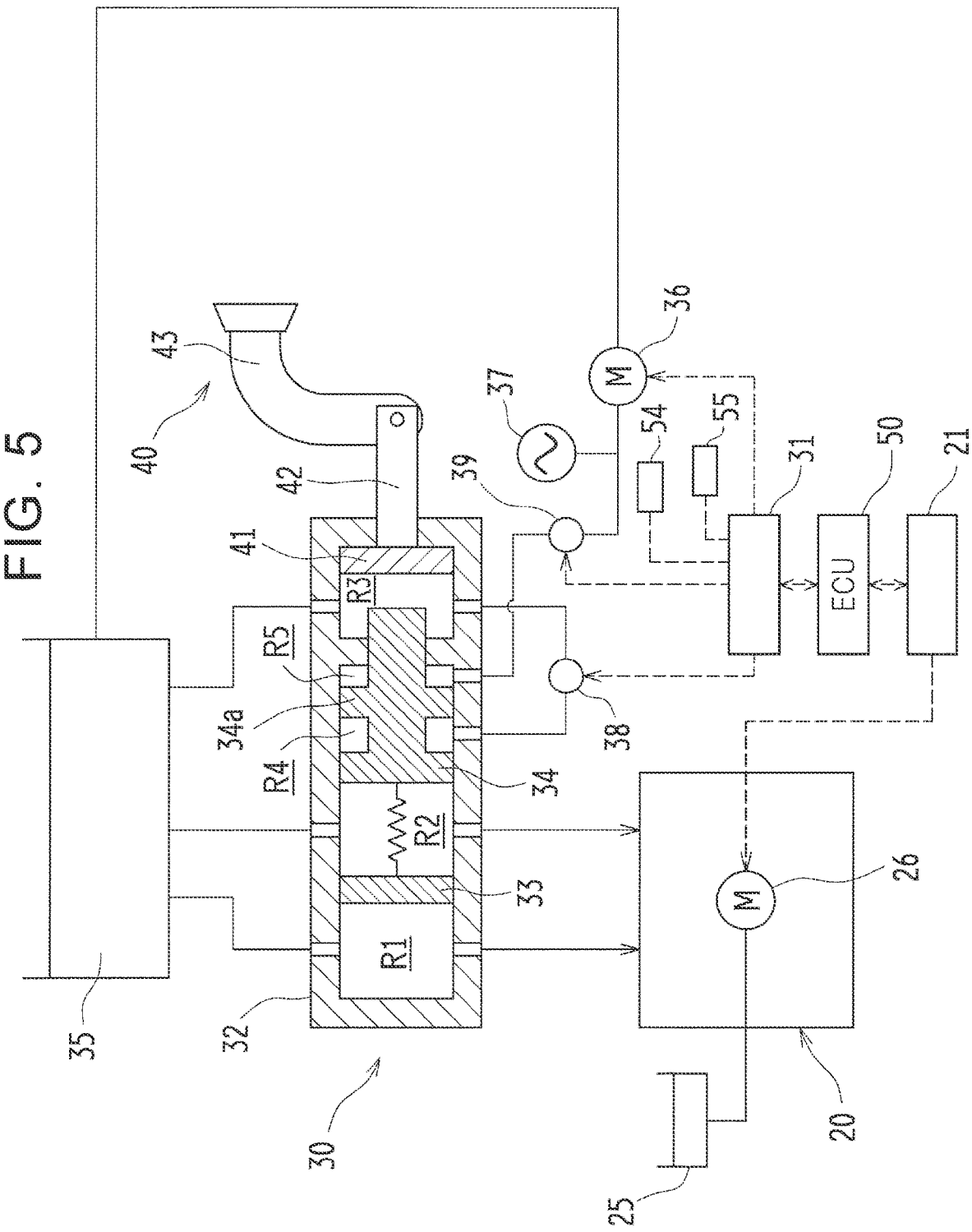
FIG. 5 is a view illustrating a schematic configuration of a brake hydraulic pressure source.

Next will be briefly described an example of a device configuration that can actuate only the brake actuator 20 in the case of (A) and actuate the master cylinder 30 in the case of (B). FIG. 5 is a view illustrating a schematic configuration of the brake hydraulic pressure source. Note that FIG. 5 only illustrates an outline and does not illustrate precise configurations of the brake actuator 20, the master cylinder 30, the brake pedal unit 40, and so on.

As illustrated in FIG. 5, the first piston 33, the second piston 34, and the input piston 41 are slidably housed inside the cylinder housing 32, and first to fifth fluid chambers R1, R2, R3, R4, R5 are formed dividedly from each other in the cylinder housing 32. The first fluid chamber R1 is connected to the reservoir tank 35 and the first fluid chamber 23 of the brake actuator 20, and brake fluid inside the first fluid chamber R1 is pressurized by the first piston 33. The second fluid chamber R2 is formed between the first piston 33 and the second piston 34 and is connected to the reservoir tank 35 and the second fluid chamber 24 of the brake actuator 20. Brake fluid inside the second fluid chamber R2 is pressurized by the second piston 34. A rib portion 34a is provided in the second piston 34 such that the fourth fluid chamber R4 is formed dividedly on a first side of the rib portion 34a (a side close to the first and second fluid chambers R1, R2), and the fifth fluid chamber R5 is formed dividedly on a second side of the rib portion 34a (a side close to the third fluid chamber R3). The third fluid chamber R3 is connected to the reservoir tank 35 and the fourth fluid chamber R4, and brake fluid inside the third fluid chamber R3 can be pressurized by the input piston 41. Note that the third fluid chamber R3 and the fourth fluid chamber R4 are connected to each other via a first electromagnetic valve 38 that opens in an energized state.

The brake ECU 31 of the master cylinder 30 is configured to drive the electric motor 36 so that the electric motor 36 pumps up the brake fluid from the reservoir tank 35 and pressurizes the brake fluid. The brake fluid is stored in an accumulator 37 in a pressurized state. The accumulator 37 is connected to the fifth fluid chamber R5 via the second electromagnetic valve 39 that opens in the energized state. Note that the brake ECU 31 is configured to basically maintain the first electromagnetic valve 38 in the energized state and also maintain the second electromagnetic valve 39 in a non-energized state except when the brake ECU 31 actuates the master cylinder 30.

In the above configuration, in the case of (A), the brake ECU 31 closes the second electromagnetic valve 39 (the non-energized state), and the brake ECU 21 of the brake actuator 20 actuates the electric motor 26 so that the electric motor 26 pumps up the brake fluid from the reservoir tank 25 and pressurizes the brake fluid. Hereby, the vehicle 1 is decelerated or stopped by the brake hydraulic pressure from the brake actuator 20 only.

In the meantime, in the case of (B), the brake ECU 31 brings the second electromagnetic valve 39 into the energized state so that the second electromagnetic valve 39 opens, and the brake ECU 31 supplies the brake fluid stored in the accumulator 37 in a pressurized state to the fifth fluid chamber R5. Here, since the first electromagnetic valve 38 is in the energized state (in a valve open state), hydraulic pressure in the third fluid chamber R3 and hydraulic pressure in the fourth fluid chamber R4 that faces the third fluid chamber R3 cancel each other, so that the second piston 34 operates only with hydraulic pressure in the fifth fluid chamber R5. Hereby, the vehicle 1 is decelerated or stopped by the brake hydraulic pressure from the master cylinder 30 only.

As described above, the vehicle 1 can be decelerated or stopped by the power of the battery 52. Accordingly, the vehicle 1 of the present embodiment can employ the layout in which the brake pedal is not permanently provided in the vehicle cabin 4 as described above. That is, the vehicle 1 of the present embodiment is provided as a vehicle configured such that brake operating means (a brake pedal or the like) mechanically connected to a brake hydraulic pressure generation device arranged in the front-side storage chamber 5 is not provided in the vehicle cabin 4.

Arrangement of Brake Hydraulic Pressure Generation Device and so on

Figure 6:
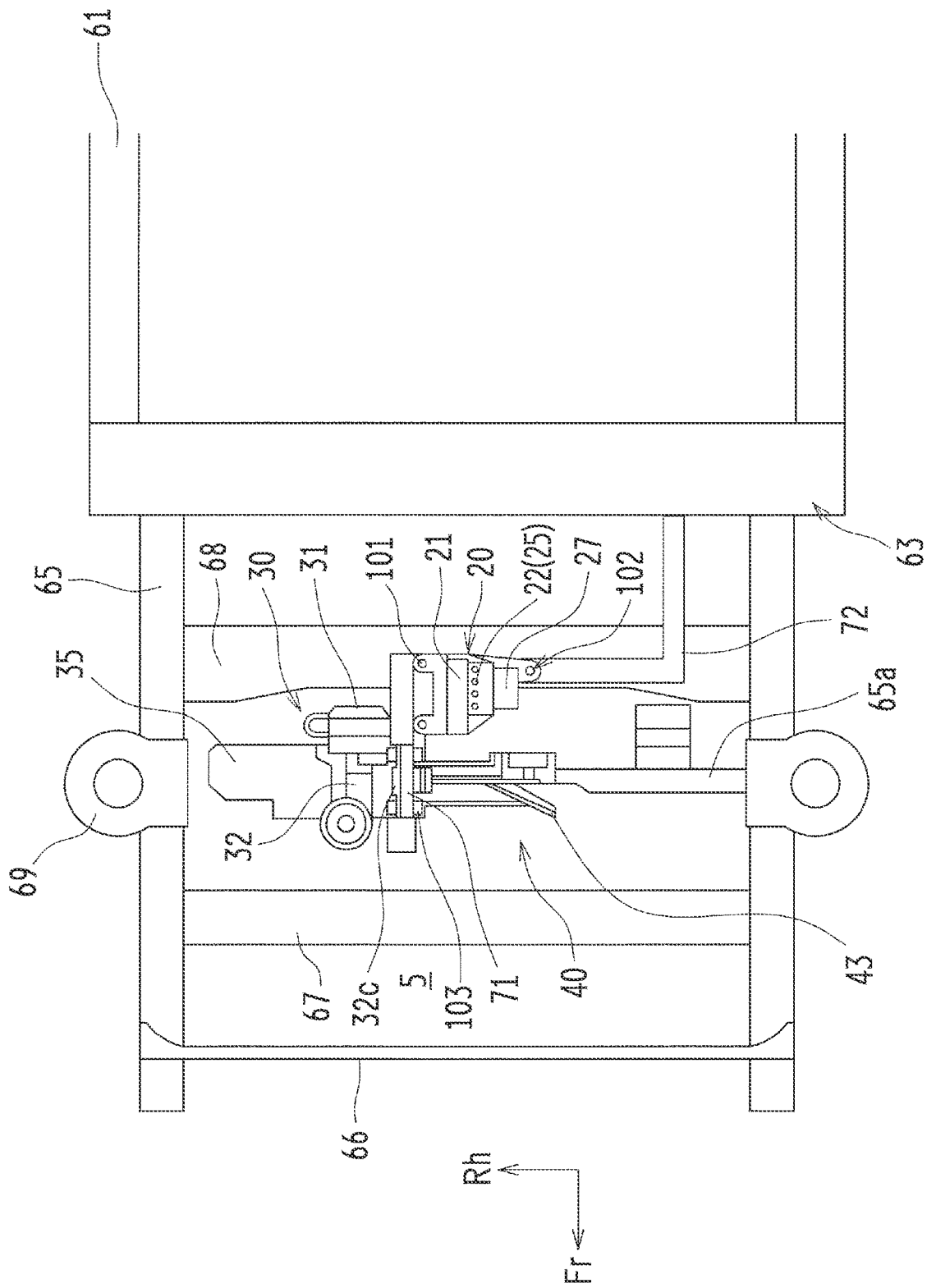
FIG. 6 is a plan view schematically illustrating respective in-vehicle states of a brake actuator, a master cylinder, and a brake pedal unit.
Figure 7:
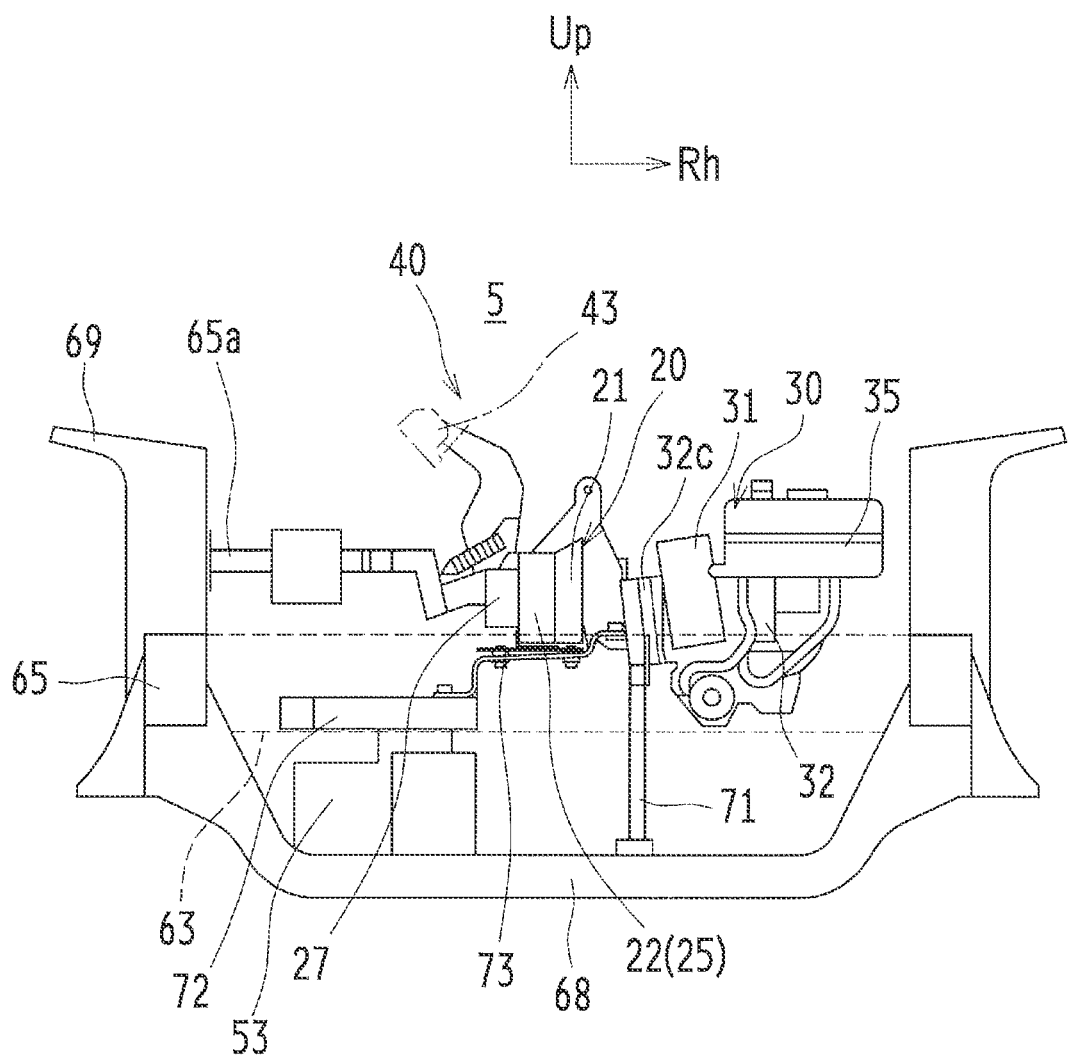
FIG. 7 is a back view schematically illustrating respective in-vehicle states of the brake actuator, the master cylinder, and the brake pedal unit.
Figure 8:
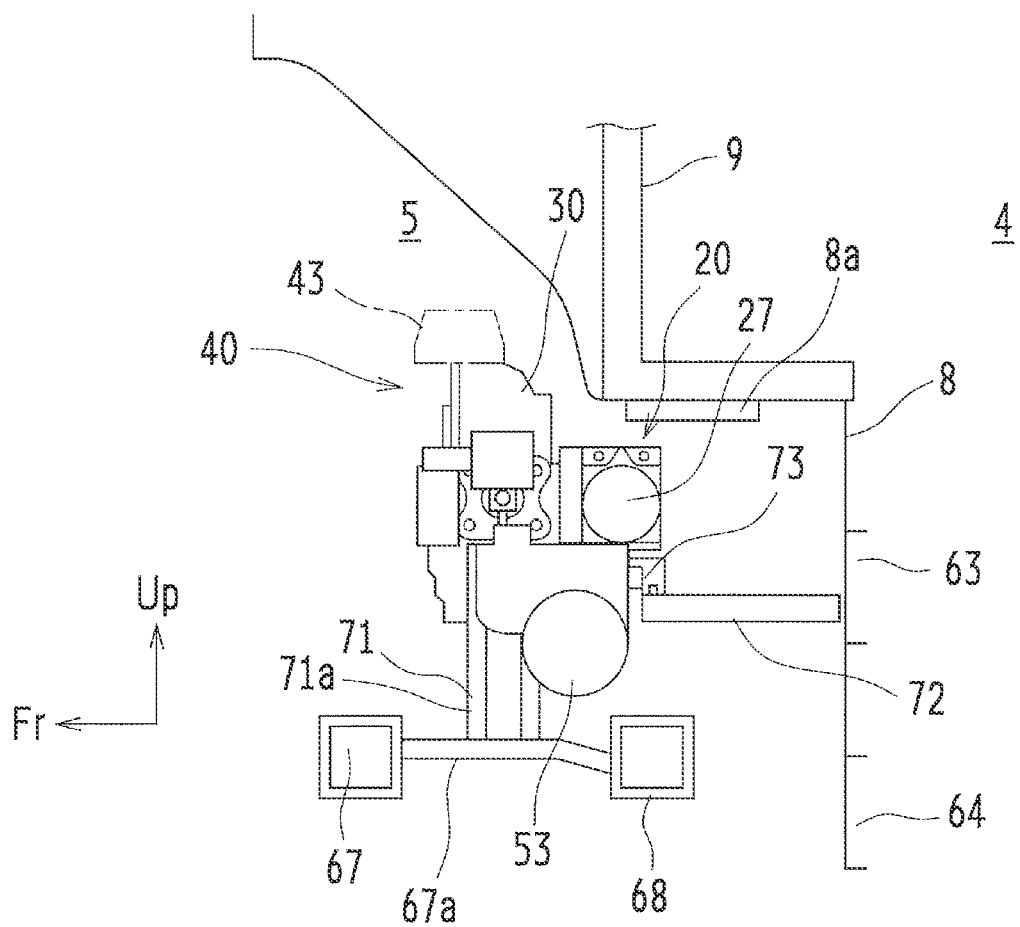
FIG. 8 is a side view schematically illustrating respective in-vehicle states of the brake actuator, the master cylinder, and the brake pedal unit.

Next will be described the structure and arrangement of the brake actuator 20, the master cylinder 30, and the brake pedal unit 40 in the front-side storage chamber 5. FIGS. 6 to 8 are a plan view, a back view, and a side view each schematically illustrating respective in-vehicle states of the brake actuator 20, the master cylinder 30, and the brake pedal unit 40.

First briefly described is the front-side storage chamber 5. As illustrated in FIG. 6, a pair of right and left side rails 61 is provided in a location corresponding to the underfloor space 6 in FIG. 2 such that the right and left side rails 61 are placed at both end portions of the underfloor space 6 in the vehicle width direction and extend in the vehicle front-rear direction. Front end portions of the side rails 61 are connected to a lower crossmember 64 out of two crossmembers 63, 64 arrayed in the up-down direction as illustrated in FIG. 8. The front-side storage chamber 5 is formed in front of the crossmembers 63, 64 in the vehicle front-rear direction.

More specifically, as illustrated in FIG. 6, a pair of right and left side rails 65 is provided such that the right and left side rails 65 extend forward in the vehicle front-rear direction from both end portions, in the vehicle width direction, of the upper crossmember 63, and front end portions of the right and left side rails 65 are connected to each other via a crossmember 66. Further, a pair of front and rear crossmembers 67, 68 is provided so as to stretch over between the right and left side rails 65 such that the front and rear crossmembers 67, 68 extend in the vehicle width direction at a position below the side rails 65 and the crossmembers 63, 66. As illustrated in FIG. 7, each of the crossmembers 67, 68 extends in the vehicle width direction such that both end portions thereof extend to be inclined upwardly toward outer sides in the vehicle width direction and are attached to respective lower parts of the side rails 65. Note that a reference numeral 69 in FIGS. 6 and 7 indicates a suspension tower.

With such a configuration, the right and left sides of the front-side storage chamber 5 are defined by the right and left side rails 65, the front and rear sides of the front-side storage chamber 5 are defined by the crossmembers 63, 66, and the lower side of the front-side storage chamber 5 is defined by the crossmembers 67, 68. Note that, as illustrated in FIG. 8, the frame member 8 or the like includes an opening-closing portion 8*a* formed below the seat 9 for an operator, the seat 9 being provided above a rear portion of the front-side storage chamber 5. Therefore, by removing or folding the seat 9, for example, the maintenance of equipment inside the front-side storage chamber 5 is performable through the opening-closing portion 8*a*.

As illustrated in FIGS. 6 and 7, in the master cylinder 30, the reservoir tank 35 extending in the same direction as the cylinder housing 32 is provided above the cylinder housing 32 extending in a sliding direction of the first and second pistons 33, 34. Therefore, as the master cylinder 30 as a whole, a length of the master cylinder 30 in the direction (the longitudinal direction) where the cylinder housing 32 extends is longer than a length of the master cylinder 30 in a direction (a longitudinal perpendicular direction) orthogonal to the direction where the cylinder housing 32 extends and a length of the master cylinder 30 in the up-down direction. Note that the brake ECU 31 is provided on a side face of the cylinder housing 32.

As such, as illustrated in FIGS. 6 and 7, the master cylinder 30 with the longitudinal direction being along the extending direction of the cylinder housing 32 (the sliding direction of the first and second pistons 33, 34) is arranged in an upper part of the front-side storage chamber 5 such that the longitudinal direction of the master cylinder 30 is parallel to the vehicle width direction. More specifically, as illustrated in FIG. 8, a support bracket 67*a* extending in the vehicle front-rear direction is provided so as to stretch over between the two crossmembers 67, 68 arranged in the front-rear direction. As a flange portion 32*c* of the cylinder housing 32 is fastened by bolts 103 to an upper end portion of a first bracket 71 extending upward from the support bracket 67*a*, the master cylinder 30 is arranged such that its longitudinal direction is along the vehicle width direction.

Further, as illustrated in FIG. 6, the brake pedal unit 40 is arranged in the upper part of the front-side storage chamber 5 so as to be arrayed with the master cylinder 30 in the vehicle width direction. Note that, since the brake pedal unit 40 is not used as a brake as described above, the stepping portion 43*a* (see virtual lines in FIGS. 6 to 9) of the brake pedal 43 is cut and removed in order to avoid interference with other members.

In the brake actuator 20, as illustrated in FIGS. 6 and 7, the brake ECU 21, the actuator body portion 22 (including the reservoir tank 25), and a motor housing 27 in which the electric motor 26 is housed are provided so as to be arrayed in this order such that the brake ECU 21, the actuator body portion 22, and the motor housing 27 at least partially overlap each other in the vehicle front-rear direction when they are viewed from the vehicle width direction. Therefore, as the brake actuator 20 as a whole, a length of the brake actuator 20 in an array direction (also referred to as an arrangement direction) where those members are arrayed is longer than a length of the brake actuator 20 in a direction orthogonal to the arrangement direction and a length of the brake actuator 20 in the up-down direction.

As such, as illustrated in FIGS. 6 and 7, the brake actuator 20 formed so as to be long in the arrangement direction is arranged behind the brake pedal 43 in the vehicle front-rear direction (near the master cylinder 30 and behind the master cylinder 30 in the vehicle front-rear direction) in the upper part of the front-side storage chamber 5, such that the longitudinal direction (the arrangement direction) of the brake actuator 20 is parallel to the vehicle width direction.

More specifically, as illustrated in FIGS. 6 and 8, an L-shaped second bracket 72 is attached to the upper crossmember 63. The second bracket 72 is configured such that, after the second bracket 72 extends forward in the vehicle front-rear direction from a front end of the crossmember 63, the second bracket 72 is bent at a right angle and extends to the right side in the vehicle width direction. A distal end portion of the second bracket 72 and the upper end portion of the first bracket 71 are connected to an actuator bracket 73 via respective bolts 101, 102, and hereby, the first and second brackets 71, 72 are integrated with the actuator bracket 73. Since the brake actuator 20 is fastened to the actuator bracket 73 by the bolt as described above, the brake actuator 20 is arranged so as to extend in the vehicle width direction behind the brake pedal 43 in the vehicle front-rear direction.

Here, as illustrated in FIGS. 7 and 8, the brake actuator 20, the master cylinder 30, and the brake pedal unit 40 are arranged at generally the same height in the upper part of the front-side storage chamber 5 such that the brake actuator 20, the master cylinder 30, and the brake pedal unit 40 are adjacent to each other in the same horizontal plane. Note that the state where the brake actuator 20, the master cylinder 30, and the brake pedal unit 40 are adjacent to each other "in the same horizontal plane" indicates a state where at least part of the brake actuator 20, at least part of the master cylinder 30, and at least part of the brake pedal unit 40 are placed on the same horizontal plane. Further, generally, it is assumed that the brake pedal 43 is rotated by stepping force applied by a driver, and therefore, the brake pedal 43 is arranged to extend downward. However, in the present embodiment, the brake pedal 43 is arranged to extend upward as illustrated in FIGS. 7 and 8.

Hereby, as illustrated in FIG. 8, a relatively large space is formed below the brake actuator 20 and the brake pedal unit 40 in the front-side storage chamber 5. On this account, in the present embodiment, an air conditioner unit 53 is arranged in the space as illustrated in FIGS. 7 and 8.

Further, except that the brake pedal unit 40 is not used as a brake, the master cylinder 30 and the brake pedal unit 40 have generally the same configurations as a conventional master cylinder and a conventional brake pedal unit. On this account, the same components can be used in common without manufacturing an exclusive master cylinder that does not include the input piston 41 and so on.

Here, since the brake pedal unit 40 is not used as a brake, it seems not necessary to connect a stroke sensor 54 and a stop lamp switch 55 to the brake ECU 31 as illustrated in FIG. 5. The stroke sensor 54 is configured to measure a stroke of the brake pedal 43, and the stop lamp switch 55 is configured to turn on a brake lamp (not shown) when the stop lamp switch 55 is turned on in response to stepping of the brake pedal 43. However, the brake ECU 31 is generally configured to receive, from the stroke sensor 54 and the stop lamp switch 55, a signal indicating that there is no measured value or the like, even when there is no measured value or the like. Therefore, when the stroke sensor 54 and the stop lamp switch 55 are omitted, a control error may occur because no signal is input into the brake ECU 31. On this account, even in a case where the brake pedal unit 40 is not used as a brake for generating braking force, it is necessary that the stroke sensor 54 and the stop lamp switch 55 be connected to the brake ECU 31.

As a matter of course, in the present embodiment, the brake pedal unit 40 is arranged inside the front-side storage chamber 5. On this account, similarly to a case where a brake pedal unit is arranged in a vehicle cabin, when the stroke sensor 54 and the stop lamp switch 55 are arranged near the brake pedal 43, it is necessary to separately take waterproof measures for the stroke sensor 54 and the stop lamp switch 55. This might cause an increase in cost.

Figure 9:
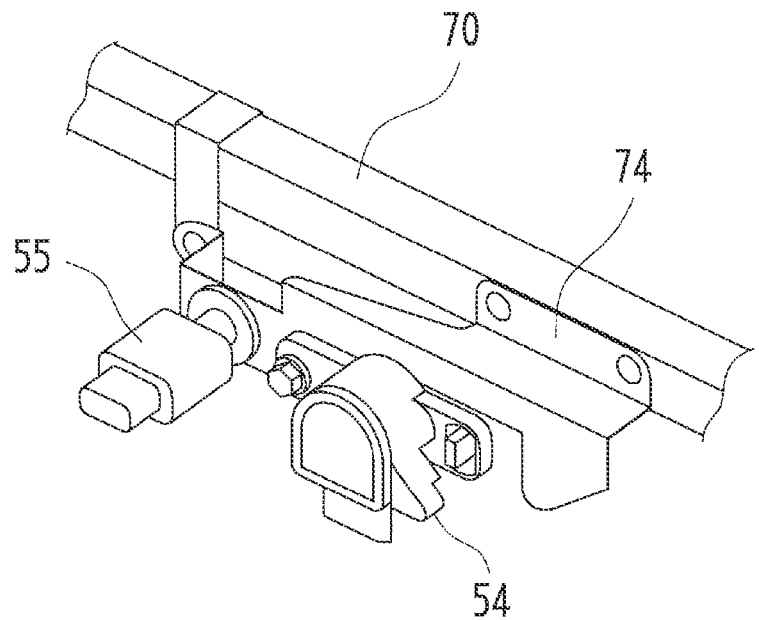
FIG. 9 is a view schematically illustrating an arrangement structure of a stroke sensor and a stop lamp switch.

In view of this, in the present embodiment, as illustrated in FIGS. 1, 2, and 9, the stroke sensor 54 and the stop lamp switch 55 are separated from the brake pedal 43 arranged in the front-side storage chamber 5 such that the stroke sensor 54 and the stop lamp switch 55 are supported by an upper frame 70 via a bracket 74. The upper frame 70 is provided inside the vehicle cabin 4.

As such, the stroke sensor 54 and the stop lamp switch 55 are separated from the brake pedal 43 arranged in the front-side storage chamber 5 such that the stroke sensor 54 and the stop lamp switch 55 are arranged inside the vehicle cabin 4. This makes it possible to surely avoid a control error without separately taking waterproof measures.

Brake Bleeding Device

In the meantime, when air is accumulated in brake fluid in the braking device, the brake does not work well. In view of this, it is necessary to regularly perform a bleeding operation to bleed the air accumulated in the brake fluid. When such a bleeding operation is performed, the vehicle body is jacked up, and tires are removed. Then, a bleeding valve provided in a caliper is loosened, and a fluid collection tube is connected. After that, due to brake hydraulic pressure generated by stepping a brake pedal several times inside a vehicle cabin, the air is discharged from the fluid collection tube together with old brake fluid. This is a general procedure.

As such, the bleeding operation is performed on the premise that brake hydraulic pressure is generated by pressing the brake pedal provided in the vehicle cabin. In the meantime, the vehicle 1 of the present embodiment is provided as a vehicle configured such that the brake pedal 43 is not provided in the vehicle cabin 4. In view of this, it is also conceivable, for example, that the brake pedal 43 is manually pressed through the opening-closing portion 8a. However, as illustrated in FIG. 8, the space above the brake pedal unit 40 is small, and therefore, it is difficult to manually press the brake pedal 43. Accordingly, maintenance performance at the time of the bleeding operation might decrease.

In view of this, in the present embodiment, a lever by which the brake pedal unit 40 provided inside the front-side storage chamber 5 is operable is set in a state where the lever is accessible from outside the vehicle. More specifically, as the brake bleeding device 80 configured to bleed the air accumulated in the brake fluid inside the braking device 10, a mechanism including an operating lever is provided. The operating lever is attached to the link mechanism 45 of the brake pedal unit 40 in a state where the link mechanism 45 is operable by the operating lever. The operating lever extends downward to a position where the operating lever is accessible from outside the front-side storage chamber 5. Hereinafter, such a brake bleeding device 80 will be described in detail.

Figure 10:
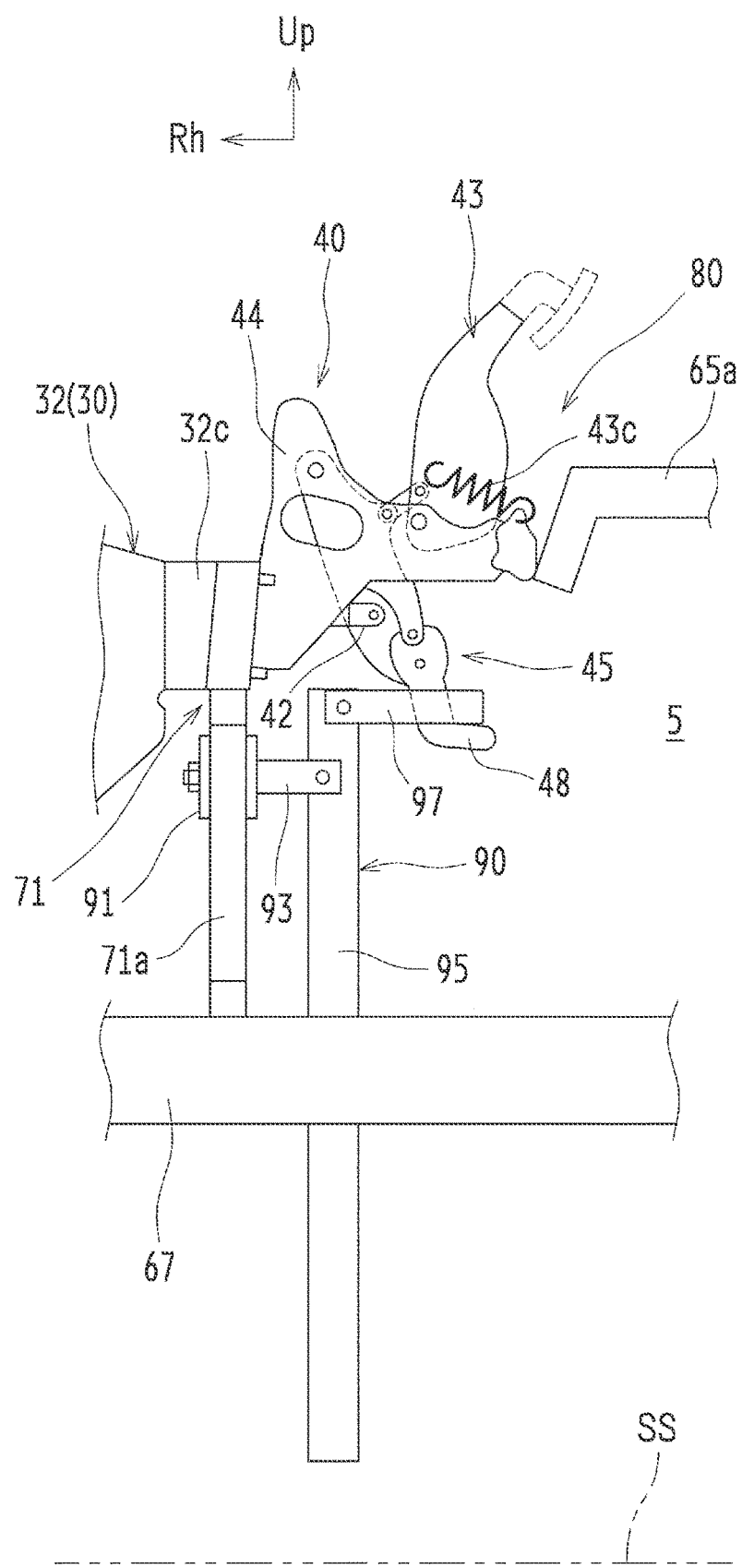
FIG. 10 is a front view schematically illustrating a brake bleeding device.

FIG. 10 is a front view schematically illustrating the brake bleeding device 80. As illustrated in FIG. 10, the brake bleeding device 80 includes the master cylinder 30, the brake pedal unit 40, and an operating lever unit 90.

Brake Pedal Unit

Figure 11:
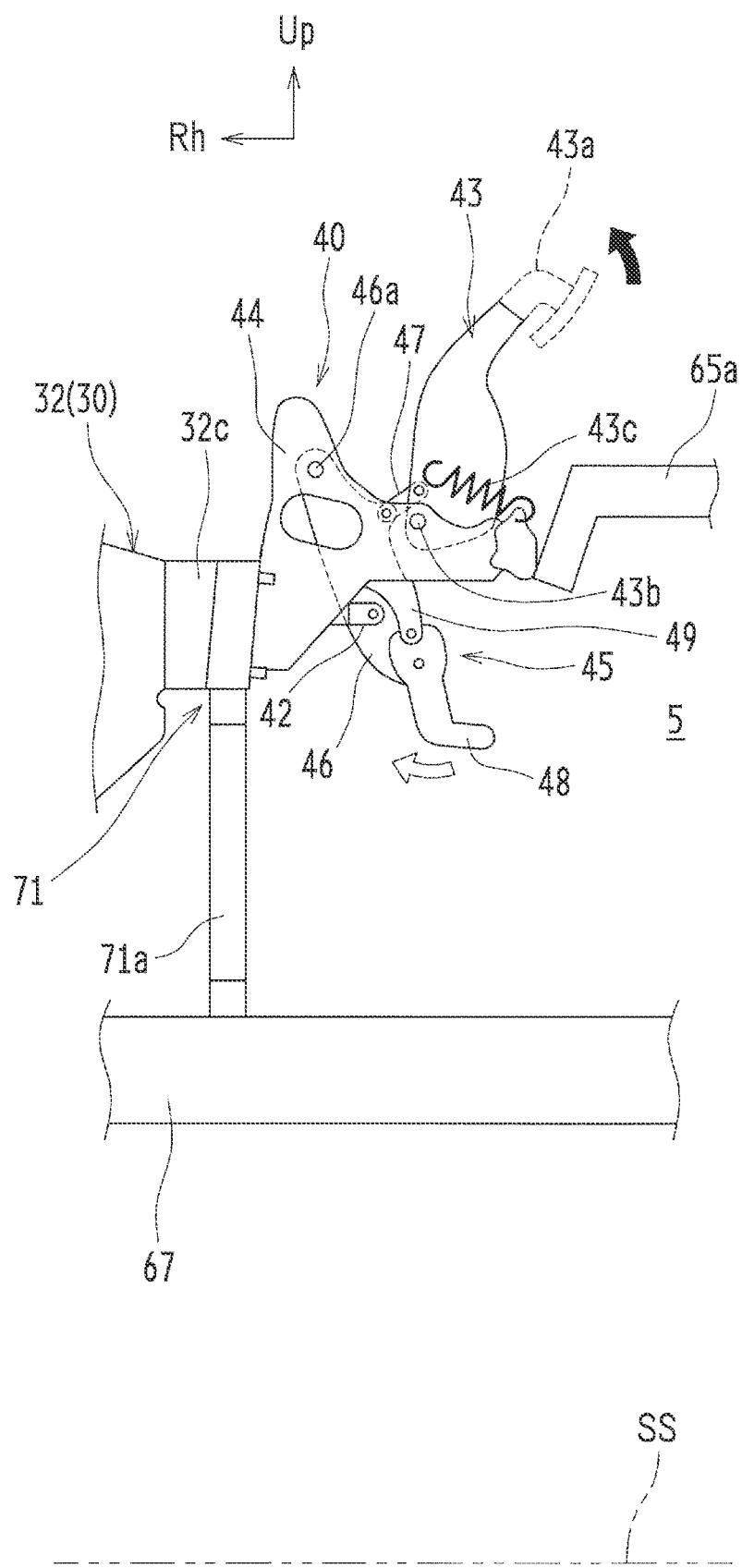
FIG. 11 is a front view schematically illustrating the master cylinder and the brake pedal unit.

FIG. 11 is a front view schematically illustrating the master cylinder 30 and the brake pedal unit 40. As described above, the brake pedal unit 40 includes a pedal bracket 44 and the link mechanism 45, as illustrated in FIG. 11, in addition to the input piston 41, the rod 42, and the brake pedal 43. The brake pedal unit 40 is arranged in the front-side storage chamber 5 such that the brake pedal 43 is placed on the upper side and the link mechanism 45 is placed on the lower side.

The pedal bracket 44 supports members constituting the brake pedal 43 and the link mechanism 45 in a rotatable manner. The pedal bracket 44 is configured such that a right end portion, in the vehicle width direction, of the pedal bracket 44 is fastened by a bolt to the upper end portion of the first bracket 71 to which the flange portion 32c of the cylinder housing 32 of the master cylinder 30 is fastened by a bolt, and a left end portion, in the vehicle width direction, of the pedal bracket 44 is fastened by a bolt to a bracket 65a extending in the vehicle width direction from the side rail 65. Hereby, the pedal bracket 44 is fixed to the vehicle body via the first bracket 71 and the bracket 65a.

The brake pedal 43 is attached to the pedal bracket 44 via a shaft 43b, so that the brake pedal 43 is rotatable relative to the pedal bracket 44 around the axis of the shaft 43b. Note that a spring 43c is provided to stretch over the brake pedal 43 and the pedal bracket 44, and hereby, the brake pedal 43 is biased clockwise in FIG. 11.

The link mechanism 45 includes a relay arm 46, an arm link 47, a first link member 48, and a second link member 49.

The relay arm 46 is attached to the pedal bracket 44 via a shaft 46a, so that the relay arm 46 is rotatable relative to the pedal bracket 44 around the axis of the shaft 46a. A second end (a left end portion in the vehicle width direction) of the rod 42 having a first end (a right end portion in the vehicle width direction) connected to the input piston 41 is connected to the relay arm 46 in a rotatable manner.

The arm link 47 is connected to the relay arm 46 in a rotatable manner and is also connected to the brake pedal 43 in a rotatable manner such that the arm link 47 connects the relay arm 46 to the brake pedal 43.

The first link member 48 and the second link member 49 are both attached to the relay arm 46 in a rotatable manner, and the first link member 48 and the second link member 49 are connected to each other in a rotatable manner. Originally (in a case where the brake pedal unit 40 is arranged inside the vehicle cabin), the first and second link members 48, 49 are configured to reduce a rearward moving amount of the brake pedal unit 40 such that, when the first link member 48 moving rearward in a front collision or the like abuts with a bracket (not shown) fixed to the vehicle body and rotates, the second link member 49 rotates in conjunction with that so as to interfere with the rod 42 and bends the rod 42 actively.

As a matter of course, in the present embodiment in which the brake pedal unit 40 is arranged in the front-side storage chamber 5, such a rearward movement restraint function is not requested, and only a function to transmit, to the relay arm 46, external force input into the first link member 48 is requested to the first link member 48. On this account, it is desirable that the first link member 48 (and the second link member 49) be fixed to the relay arm 46 in a non-rotatable manner.

In the brake pedal unit 40 configured as described above, if the brake pedal 43 is pressed toward a black arrow in FIG. 11, the brake pedal 43 rotates counterclockwise relative to the pedal bracket 44 around the shaft 43b. When the brake pedal 43 rotates counterclockwise as such, the relay arm 46 pressed via the arm link 47 rotates clockwise relative to the pedal bracket 44 around the shaft 46a as indicated by a blank arrow in FIG. 11, so that the rod 42 is displaced toward the right side in the vehicle width direction.

Based on the same principle as this, in the brake pedal unit 40, when the first link member 48 is pulled toward the blank arrow in FIG. 11, the relay arm 46 rotates clockwise relative to the pedal bracket 44 around the shaft 46a, so that the rod 42 is displaced toward the right side in the vehicle width direction. When the relay arm 46 rotates clockwise as such, the brake pedal 43 thus pulled via the arm link 47 rotates counterclockwise relative to the pedal bracket 44 around the shaft 43b as indicated by the black arrow in FIG. 11.

Note that, in terms of correspondence relations with claims, the link mechanism 45 (particularly the relay arm 46 and the first link member 48) of the present embodiment corresponds to an "operating portion connected to a piston via a rod" as described in claims, and the brake pedal unit 40 of the present embodiment corresponds to a "pressing portion arranged inside a storage chamber and configured to give pressing force in a stroke direction to a piston when the operating portion connected to the piston via the rod is operated" as described in claims.

Operating Lever Unit

Figure 12:
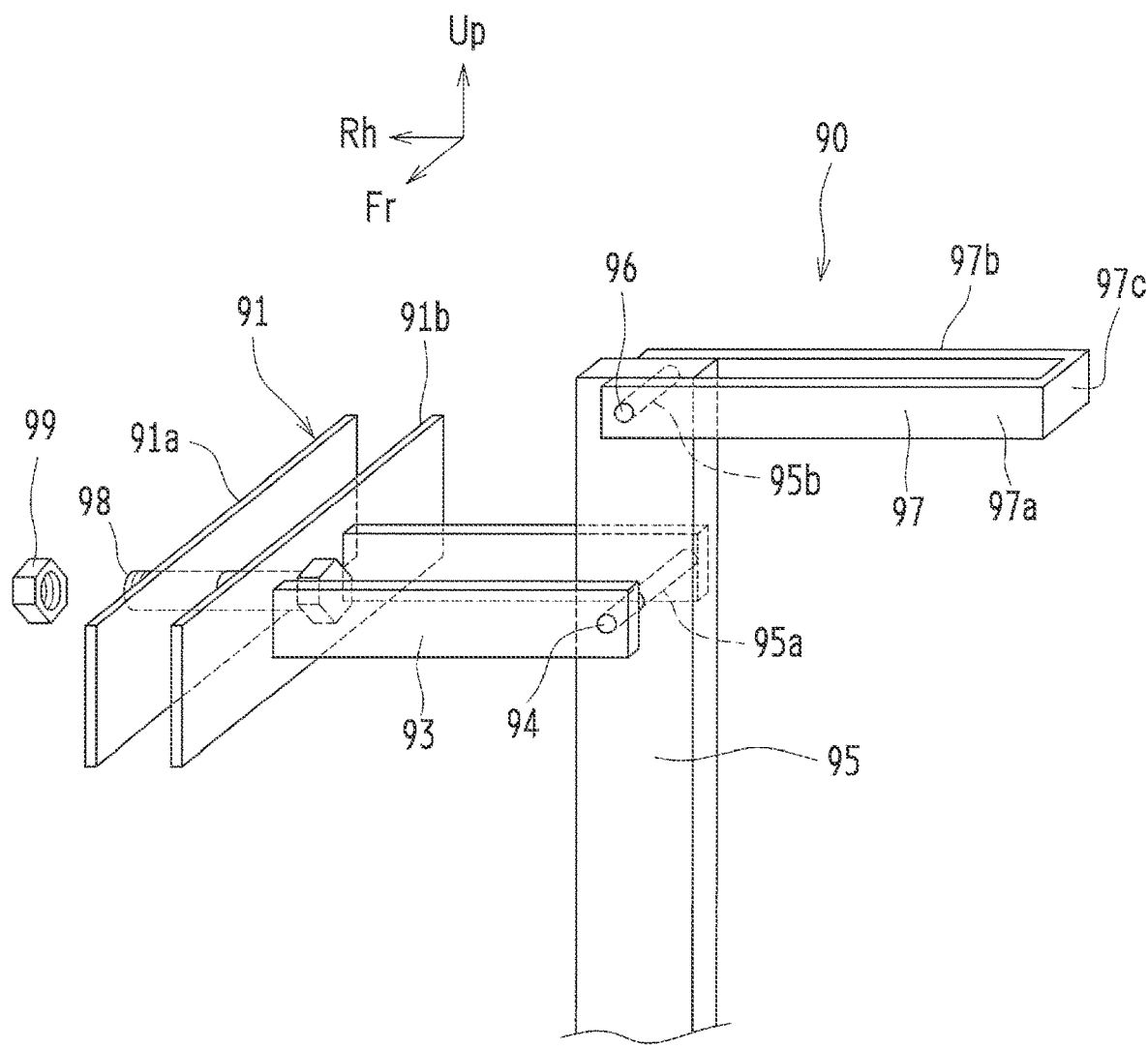
FIG. 12 is a perspective view schematically illustrating an operating lever unit.

FIG. 12 is a perspective view schematically illustrating the operating lever unit 90. The operating lever unit 90 is made of a metal plate and includes a pair of fixing plates 91, a pair of support plates 93, an operating lever 95, and an engageable member 97, as illustrated in FIG. 12.

The fixing plates 91 include a rectangular first fixing plate 91a and a rectangular second fixing plate 91b. The first and second fixing plates 91a, 91b are formed in the same shape with the same size and have respective bolt holes (not shown) in their central parts. In the second fixing plate 91b, a head of a bolt 98 passing through the bolt hole is fixed by welding or the like.

The first and second fixing plates 91a, 91b are arranged so as to face each other along the vehicle width direction with a fixation target object being sandwiched therebetween. After that, a distal end of the bolt 98 fixed to the second fixing plate 91b is passed through the bolt hole of the first fixing plate 91a and tightened by a nut 99 threadedly engaged from a distal end side of the bolt 98, so that the fixation target object sandwiched between the first fixing plate 91a and the second fixing plate 91b is tightened as if the fixation target object is tightened by a clamp. Hereby, the first and second fixing plates 91a, 91b are fixed to the fixation target object.

The support plates 93 are fixed to a left surface, in the vehicle width direction, of the second fixing plate 91b by welding or the like in a posture where the support plates 93 face each other in the vehicle front-rear direction with the head of the bolt 98 being sandwiched therebetween. The support plates 93 extend straight toward the left side in the vehicle width direction. A shaft 94 is fixed by welding or the like to a distal end portion (a left end portion in the vehicle width direction) of each of the support plates 93. The shaft 94 extends in the vehicle front-rear direction between the support plates 93.

The operating lever 95 is formed in an elongated rectangular shape and extends in the up-down direction. Two through-holes 95a, 95b are formed in an upper part of the operating lever 95 such that the through-holes 95a, 95b are aligned in the up-down direction. The through-holes 95a, 95b penetrate through the operating lever 95 in the vehicle front-rear direction. As illustrated in FIG. 12, in a state where the operating lever 95 is sandwiched between the support plates 93 in the vehicle front-rear directions, the shaft 94 fixed to the distal end portions of the support plates 93 is inserted into the through-hole 95a on the lower side. Hereby, the operating lever 95 is attached in a rotatable manner relative to the support plates 93 around the axis of the shaft 94.

The engageable member 97 is formed such that left end portions, in the vehicle width direction, of a pair of plate members 97a, 97b are connected to each other via a plate member 97c having a short rectangular shape. The plate members 97a, 97b face each other in the vehicle front-rear direction and extend in the vehicle width direction. Thus, the engageable member 97 has a hairpin shape in a plan view. A shaft 96 is fixed by welding or the like to base end portions (right end portions in the vehicle width direction) of the plate members 97a, 97b. The shaft 96 extends in the vehicle front-rear direction between the plate members 97a, 97b. As illustrated in FIG. 12, in a state where the upper end portion of the operating lever 95 is sandwiched between the plate members 97a, 97b, the shaft 96 is inserted into the upper through-hole 95b of the operating lever 95, so that the engageable member 97 is attached to the operating lever 95 in a rotatable manner relative to the operating lever 95 around the axis of the shaft 96.

Figure 13:
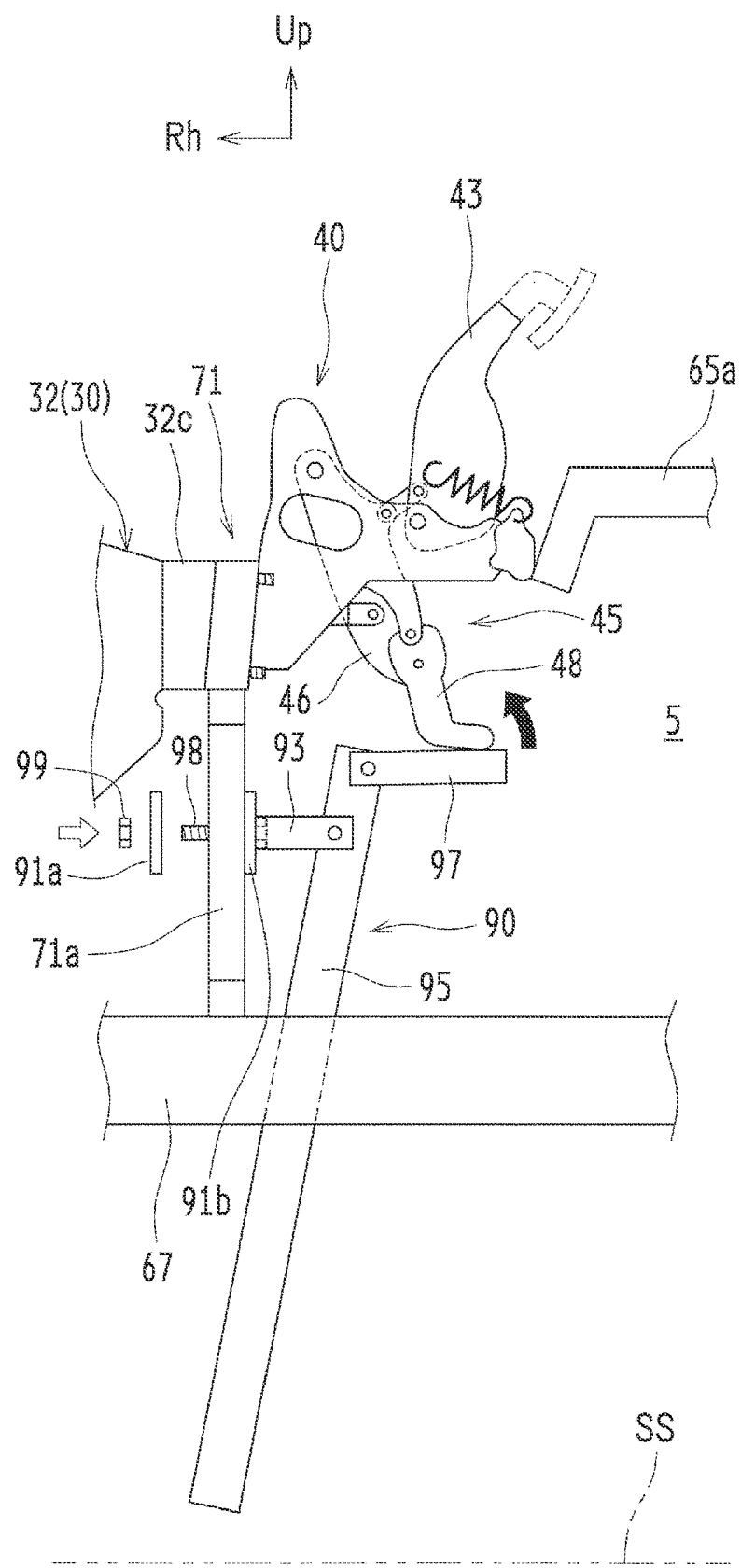
FIG. 13 is a view to schematically describe an attachment method of the operating lever unit.

FIG. 13 is a view to schematically describe an attachment method of the operating lever unit 90. The operating lever unit 90 configured as described above is detachably attached to the link mechanism 45 of the brake pedal unit 40 from below the vehicle 1 outside the front-side storage chamber 5 (from below the crossmembers 67, 68) as described below.

First, after the vehicle body is jacked up, the operating lever unit 90 is inserted into a space between the front and rear crossmembers 67, 68. Then, the engageable member 97 with its distal end portion being closed is hooked to the first link member 48 of the link mechanism 45 from below as indicated by a black arrow in FIG. 13.

Subsequently, the second fixing plate 91b is brought into contact with two leg portions 71a of the first bracket 71 from the left side in the vehicle width direction so that the bolt 98 is passed through between the two leg portions 71a. The first bracket 71 supports the master cylinder 30 and the pedal bracket 44. Subsequently, as indicated by a blank arrow in FIG. 13, while the bolt 98 is passed through the bolt hole of the first fixing plate 91a, the first fixing plate 91a is brought into contact with the two leg portions 71a from the right side in the vehicle width direction, and then, the nut 99 threadedly engaged with the bolt 98 is tightened. By fastening the two leg portions 71a sandwiched between the first fixing plate 91a and the second fixing plate 91b, the fixing plates 91 are fixed to the first bracket 71.

In accordance with the above procedure, the brake bleeding device 80 including the master cylinder 30, the brake pedal unit 40, and the operating lever unit 90 can be easily achieved by the operation performed from below the vehicle 1 as illustrated in FIG. 10. In a state where the operating lever 95 is attached to the first link member 48 of the link mechanism 45 via the engageable member 97 as such, the lower end portion of the operating lever 95 extends to the vicinity of a ground plane SS for the vehicle 1. As such, the lower end portion of the operating lever 95 projects downward from the crossmembers 67, 68 defining the lower side of the front-side storage chamber 5, and thus, the operating lever 95 can be easily accessed from outside the front-side storage chamber 5. Note that, in a case where the operating lever unit 90 is removed after completion of bleeding, the operating lever unit 90 is removed in a reverse manner to the above procedure.

Bleeding Operation

Figure 14:
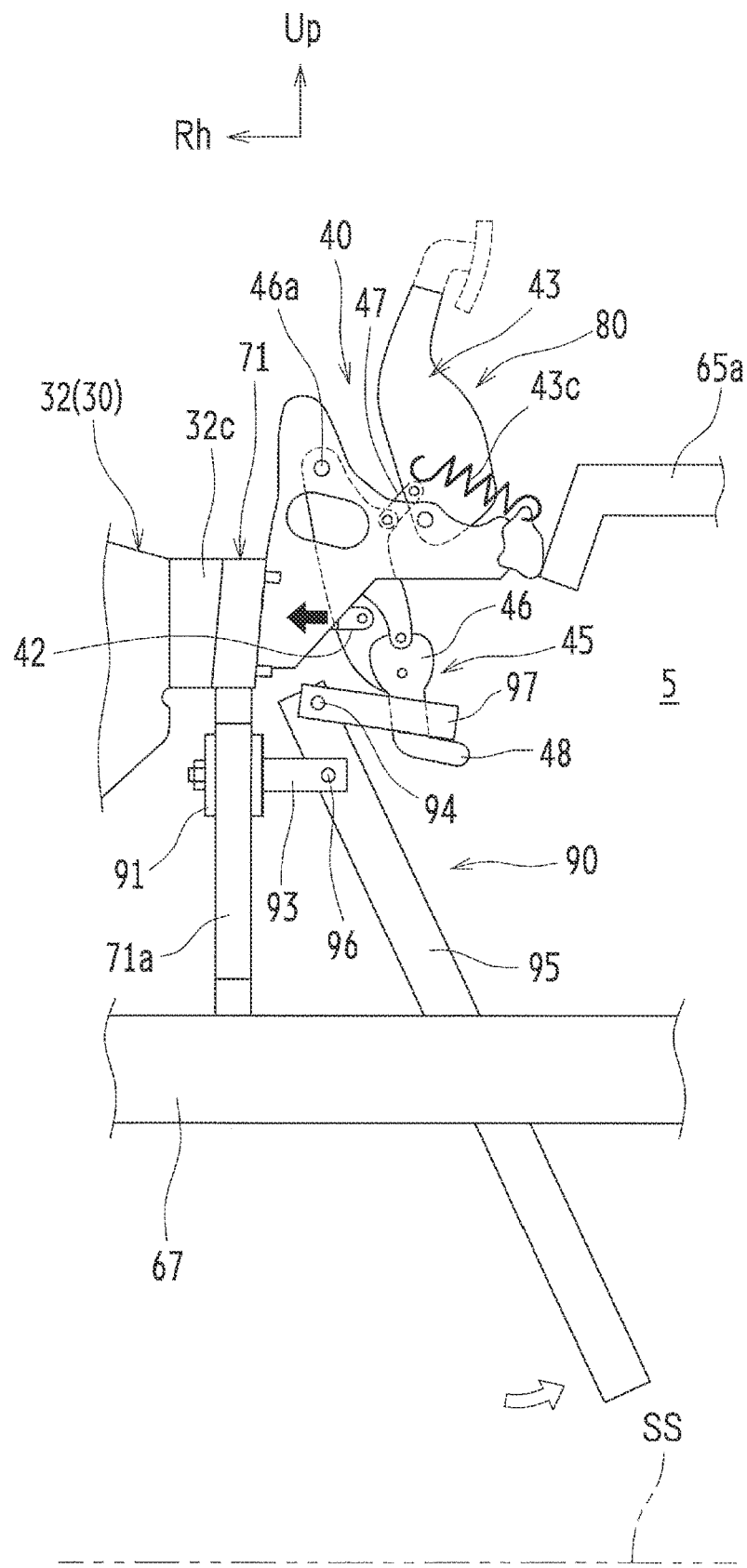
FIG. 14 is a view to schematically describe a state where the brake pedal unit is operated by an operation of the operating lever.

FIG. 14 is a view to schematically describe a state where the brake pedal unit 40 is operated by an operation of the operating lever 95. In a case where the bleeding operation is performed by use of the brake bleeding device 80, the vehicle body is jacked up, and the tires are removed. Then, bleeding valves (not shown) provided in the brake calipers 11a, 12a are loosened, and the fluid collection tube (not shown) is connected thereto.

Subsequently, after the operating lever unit 90 is attached in accordance with the above procedure to create the state illustrated in FIG. 10, the lower end portion of the operating lever 95 is gripped from below the vehicle 1, i.e., from outside the front-side storage chamber 5 (the lower end portion of the operating lever 95 is accessed), and the lower end portion of the operating lever 95 is pressed to the left side in the vehicle width direction as indicated by a blank arrow in FIG. 14. As a result, the operating lever 95 is rotated around the axis of the shaft 94, so that the upper end portion of the operating lever 95 is displaced to the right side in the vehicle width direction. Along with this, the engageable member 97 pulls the first link member 48 to the right side in the vehicle width direction.

When the first link member 48 is pulled to the right side in the vehicle width direction as such, the relay arm 46 rotates clockwise relative to the pedal bracket 44 around the shaft 46a, so that the rod 42 is displaced to the right side in the vehicle width direction as indicated by a black arrow in FIG. 14. When the rod 42 is displaced to the right side in the vehicle width direction as such, the input piston 41 is pressed into a pressurizing side, and the hydraulic pressure in the third fluid chamber R3 increases.

Here, at the time of the bleeding operation, a power source for the brake ECU 31 is turned off. Accordingly, the first electromagnetic valve 38 is in a non-energized state, that is, in a closed state. When the first electromagnetic valve 38 is closed as such, the hydraulic pressure in the third fluid chamber R3 does not cancel the hydraulic pressure in the fourth fluid chamber R4 that faces the third fluid chamber R3, so that the second piston 34 operates by the hydraulic pressure in the third fluid chamber R3. Hereby, brake hydraulic pressure is generated inside the braking device 10, so that the air can be discharged from the fluid collection tube together with old brake fluid, the fluid collection tube being connected to the bleeding valves.

Further, in the present embodiment, the stepping portion 43a of the brake pedal 43 is cut and removed, but other parts of the brake pedal 43 remain. The brake pedal 43 thus pulled via the arm link 47 is biased clockwise by the spring 43c in FIG. 14. Accordingly, when force to press the lower end portion of the operating lever 95 to the left side in the vehicle width direction is loosened, the operating lever 95 returns to a state illustrated in FIG. 10.

The operation to press the lower end portion of the operating lever 95 to the left side in the vehicle width direction from the state illustrated in FIG. 10 so as to bring the operating lever 95 into the state illustrated in FIG. 14 is repeated several times. Hereby, the bleeding operation is finished. Note that, differently from a conventional bleeding operation in which a brake pedal is stepped inside a vehicle cabin several times, in the present embodiment, brake hydraulic pressure is generated by the operation of the operating lever 95 from outside the vehicle (outside the vehicle cabin 4 and outside the front-side storage chamber 5). Accordingly, the present embodiment has such an advantage that the operating lever 95 can be operated by one operator while the operator checks the air discharged from the fluid collection tube.

Operations and Effects

In the brake bleeding device 80 of the present embodiment, brake hydraulic pressure can be generated by operating, by the operating lever 95, the link mechanism 45 (the relay arm 46 and the first link member 48) connected to the input piston 41 via the rod 42. Accordingly, even when the brake pedal unit 40 is arranged inside the front-side storage chamber 5 separated from the vehicle cabin 4, in other words, when the brake pedal unit 40 is not provided inside the vehicle cabin 4, the air accumulated in the brake fluid can be surely bled.

Besides, the operating lever 95 attached to the first link member 48 extends downward to a position where the operating lever 95 is accessible from outside the front-side storage chamber 5, and therefore, the operating lever 95 can be easily operated from outside the vehicle. Hereby, operations such as connection of the fluid collection tube to the bleeding valves, bleeding by the operation of the operating lever 95, and check of the air discharged from the fluid collection tube, for example, are performable by only one operator. Further, all operations necessary for bleeding are performable from outside the vehicle. Accordingly, an operation such as a removal operation to remove the seat 9 or a folding operation to fold the seat 9 in order to expose the opening-closing portion 8a can be omitted. This makes it possible to improve the maintenance performance at the time of the bleeding operation.

Further, an existing brake configuration including the master cylinder 30 and the brake pedal unit 40 can be used, thereby making it possible to restrain an increase in cost.

Further, since the link mechanism 45 is placed on the lower side, an attachment structure of the operating lever 95 to the first link member 48 can be made a simple structure. Also, since the brake pedal 43 is placed on the upper side, it is possible to restrain the brake pedal 43 from interfering with the air conditioner unit 53 and so on placed on the lower side.

Further, since the operating lever unit 90 is detachably attached to the link mechanism 45, the operating lever unit 90 can be removed at the time of traveling, for example. This makes it possible to restrain the lower end portion of the operating lever 95 from interfering with an object on a road surface. In the meantime, since the operating lever 95 is attachable from below the vehicle 1, the operating lever unit 90 can be easily attached to the link mechanism 45. This makes it possible to further improve the maintenance performance at the time of the bleeding operation.

Other Embodiments

The present disclosure is not limited to the above embodiment and can be carried out in other various forms without departing from the spirit or main feature of the present disclosure.

In the above embodiment, the engageable member 97 is engaged with the first link member 48. However, the present disclosure is not limited to this, provided that the rod 42 can be displaced by operating the operating lever 95. For example, the engageable member 97 may be engaged with the relay arm 46, or the engageable member 97 may be engaged with the brake pedal 43.

Further, in the above embodiment, the brake pedal unit 40 is arranged inside the front-side storage chamber 5 such that the brake pedal 43 is placed on the upper side and the link mechanism 45 is placed on the lower side. However, the present disclosure is not limited to this, provided that the brake pedal 43 and the link mechanism 45 do not interfere with other devices. For example, the brake pedal unit 40 may be arranged inside the front-side storage chamber 5 such that the brake pedal 43 is placed on the lower side and the link mechanism 45 is placed on the upper side, or the brake pedal unit 40 may be arranged inside the front-side storage chamber 5 such that the brake pedal 43 is placed on a first side in the vehicle front-rear direction and the link mechanism 45 is placed on a second side in the vehicle front-rear direction.

Further, in the above embodiment, the operating lever unit 90 is detachably attached to the link mechanism 45. However, the present disclosure is not limited to this. For example, the operating lever unit 90 may be provided permanently such that the lower end portion of the operating lever 95 is set at generally the same height as the cross-members 67, 68 and so on, and the engageable member 97 is integrated with the first link member 48.

Further, in the above embodiment, the head of the bolt 98 is fixed to the second fixing plate 91b. However, the present disclosure is not limited to this. For example, the nut 99 may be fixed to the second fixing plate 91b by welding or the like.

Thus, the above embodiment is just an example in every respect and must not be interpreted restrictively. Further, modifications and alterations belonging to an equivalent range of Claims are all included in the present disclosure.

With the present disclosure, even in a case where operating means configured to generate hydraulic pressure is not provided inside a vehicle cabin, the maintenance performance at the time of the bleeding operation can be improved. Accordingly, the present disclosure is extremely useful when the present disclosure is applied to a brake bleeding device configured to bleed air accumulated in brake fluid.

What is claimed is:

1. A brake bleeding device for bleeding air accumulated in brake fluid inside a braking device provided in a vehicle, the brake bleeding device comprising:
    a master cylinder constituting a part of the braking device and arranged inside a storage chamber separated from a vehicle cabin, the master cylinder being configured to generate brake hydraulic pressure in accordance with a stroke of a piston sliding inside the cylinder;
    a pressing portion arranged inside the storage chamber and configured to give pressing force in a stroke direction to the piston when an operating portion connected to the piston via a rod is operated; and
    an operating lever attached to the operating portion in a state where the operating portion is operable by the operating lever, wherein the operating lever extends downward to a position where the operating lever is accessible from outside the storage chamber,
    wherein:
    the pressing portion is a brake pedal unit including a brake pedal and a link mechanism configured to displace the rod in response to an operation of the brake pedal;
    the operating portion is the link mechanism; and
    the brake pedal unit is arranged inside the storage chamber such that the brake pedal is placed on an upper side and the link mechanism is placed on a lower side.

2. The brake bleeding device according to claim 1, wherein the operating lever is configured to be detachably attached to the operating portion from below the vehicle.

* * * * *